United States Patent
Wang et al.

(10) Patent No.: US 10,123,342 B2
(45) Date of Patent: Nov. 6, 2018

(54) METHOD, APPARATUS, AND DEVICE FOR ADMISSION IN CONNECTED MODE

(71) Applicant: HUAWEI TECHNOLOGIES CO., LTD., Shenzhen, Guangdong (CN)

(72) Inventors: Huisong Wang, Shenzhen (CN); Zhiqiang Ju, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 93 days.

(21) Appl. No.: 15/270,420

(22) Filed: Sep. 20, 2016

(65) Prior Publication Data

US 2017/0013633 A1 Jan. 12, 2017

Related U.S. Application Data

(63) Continuation of application No. PCT/CN2014/073826, filed on Mar. 21, 2014.

(51) Int. Cl.
| | |
|---|---|
| *H04W 72/08* | (2009.01) |
| *H04W 48/18* | (2009.01) |
| *H04L 5/00* | (2006.01) |
| *H04L 25/02* | (2006.01) |
| *H04W 24/08* | (2009.01) |
| *H04W 88/06* | (2009.01) |

(52) U.S. Cl.
CPC ......... *H04W 72/085* (2013.01); *H04L 5/0057* (2013.01); *H04L 25/0202* (2013.01); *H04W 24/08* (2013.01); *H04W 48/18* (2013.01); *H04W 72/082* (2013.01); *H04W 88/06* (2013.01)

(58) Field of Classification Search
CPC .................................................... H04W 48/18
See application file for complete search history.

(56) References Cited

U.S. PATENT DOCUMENTS

| | | | |
|---|---|---|---|
| 2008/0117884 A1 | 5/2008 | Ishii et al. | |
| 2011/0319072 A1* | 12/2011 | Ekici .................... | H04W 48/18 455/426.1 |

(Continued)

FOREIGN PATENT DOCUMENTS

| | | |
|---|---|---|
| CN | 101207900 A | 6/2008 |
| CN | 102572982 A | 7/2012 |

(Continued)

OTHER PUBLICATIONS

Chinese Office Action dated May 11, 2017 in corresponding Chinese Patent Application No. 201480000348.9.

(Continued)

*Primary Examiner* — Gary Mui
(74) *Attorney, Agent, or Firm* — Staas & Halsey LLP

(57) ABSTRACT

A method includes: receiving, by a decision device, throughput rates that are separately sent by wireless network devices in m wireless networks and can be separately obtained by a wireless multimode terminal in the m wireless networks, where the m wireless networks are wireless networks that can be currently accessed by the wireless multimode terminal, and m≥2; and determining, by the decision device according to the throughput rates that can be separately obtained by the wireless multimode terminal in the m wireless networks, a wireless network that is suitable to be accessed by the wireless multimode terminal in connected mode.

22 Claims, 4 Drawing Sheets

(56) References Cited

U.S. PATENT DOCUMENTS

| | | | | |
|---|---|---|---|---|
| 2013/0028069 | A1* | 1/2013 | Pelletier | H04W 72/0453 370/216 |
| 2013/0121145 | A1 | 5/2013 | Draznin et al. | |
| 2013/0137423 | A1* | 5/2013 | Das | H04W 88/10 455/426.1 |
| 2013/0217435 | A1* | 8/2013 | Tarraf | H04W 24/02 455/552.1 |
| 2014/0153546 | A1* | 6/2014 | Kim | H04W 48/18 370/332 |
| 2014/0323087 | A1* | 10/2014 | Huang | H04W 48/16 455/411 |

FOREIGN PATENT DOCUMENTS

| | | |
|---|---|---|
| CN | 103139870 A | 6/2013 |
| CN | 103188761 A | 7/2013 |
| EP | 1 835 780 A2 | 9/2007 |
| WO | 2012/152164 A1 | 11/2012 |
| WO | 2014/016280 A1 | 1/2014 |
| WO | 2014/026714 A1 | 2/2014 |

OTHER PUBLICATIONS

International Search Report dated Dec. 24, 2014 in corresponding International Application No. PCT/CN2014/073826.

Extended European Search Report dated Nov. 29, 2016 from European Patent Application No. 14886293.1.

Intel Corporation, "3GPP TSG-RAN WG2 Meeting #81bis; R2-131348; WLAN/3GPP Access Network Selection Based on Maximum Achievable Rate Metric", Apr. 6, 2013 (Apr. 6, 2013), XP050699495, 8 pages total.

Intel Corporation, "3GPP TSG-RAN WG2 Meeting #83bis; R2-133604; Performance benefits of RAN level enhancements for WLAN/3GPP", Oct. 7, 2013 (Oct. 7, 2013), XP0507526, pp. 1-9.

* cited by examiner

METHOD, APPARATUS, AND DEVICE FOR ADMISSION IN CONNECTED MODE

CROSS-REFERENCE TO RELATED APPLICATIONS

This application is a continuation of International Application No. PCT/CN2014/073826, filed on Mar. 21, 2014, the disclosure of which is hereby incorporated by reference in its entirety.

TECHNICAL FIELD

The present invention relates to the communications field, and in particular, to a method, an apparatus, and a device for admission in connected mode.

BACKGROUND

Future wireless networks will operate in an environment in which multiple types of wireless networks coexist. In a case in which coverage areas of multiple types of wireless networks are overlapped, when a wireless multimode terminal that is used by a user and can access the multiple types of wireless networks establishes a communication connection to a wireless network, or a handover is performed between two wireless networks in a communication process, or a new wireless network is discovered in a moving process, a suitable wireless network needs to be selected for access so as to perform communication. The so-called admission in connected mode refers to selection, for a wireless multimode terminal according to an actual condition of a current wireless network resource, of a wireless network that is suitable for access in connected mode. The wireless multimode terminal may access a cell in the wireless network according to the wireless network that is suitable for access.

For example, as shown in FIG. 1A, FIG. 1A illustrates an instance of network selection in a case in which two types of wireless networks Universal Mobile Telecommunications System (UMTS, Universal Mobile Telecommunications System) and Long Term Evolution (LTE, Long Term Evolution) coexist. A wireless multimode terminal may choose to access the UMTS network or the LTE network to perform communication. In an existing mechanism of admission in connected mode with respect to the UMTS and the LTE, a wireless multimode terminal is allowed to preferentially camp on the LTE, and is preferentially admitted to the LTE in connected mode.

However, the mechanism of admission in connected mode that allows the wireless multimode terminal to preferentially camp on or allows preferential admission to the LTE leads to relatively excessive wireless multimode terminals accessing the LTE, and consequently the LTE network is overloaded, which affects communication quality of a wireless multimode terminal accessing the LTE network.

SUMMARY

Embodiments of the present invention provide a method, an apparatus, and a device for admission in connected mode, which can properly determine a wireless network that is suitable to be accessed by a wireless multimode terminal in connected mode and optimize configuration of network resources.

According to a first aspect, an embodiment of the present invention provides a method for admission in connected mode, including:

receiving, by a decision device, throughput rates that are separately sent by radio network devices in m wireless networks and can be separately obtained by a wireless multimode terminal in the m wireless networks, where the m wireless networks are wireless networks that can be currently accessed by the wireless multimode terminal, and m≥2; and determining, by the decision device according to the throughput rates that can be separately obtained by the wireless multimode terminal in the m wireless networks, a wireless network that is suitable to be accessed by the wireless multimode terminal in connected mode.

With reference to the first aspect, in a first possible implementation manner of the first aspect, the determining, by the decision device according to the throughput rates that can be separately obtained by the wireless multimode terminal in the m wireless networks, a wireless network that is suitable to be accessed by the wireless multimode terminal in connected mode includes:

when the throughput rates that can be separately obtained by the wireless multimode terminal in the m wireless networks are completely equal, randomly determining, by the decision device, one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determining, by the decision device, a wireless network corresponding to the throughput rate with the largest value as the wireless network that is suitable to be accessed by the wireless multimode terminal in connected mode, or if a quantity of throughput rates with a largest value is greater than 1, randomly determining, by the decision device, one wireless network of wireless networks corresponding to the throughput rates with the largest value as the wireless network that is suitable to be accessed by the wireless multimode terminal in connected mode.

With reference to the first possible implementation manner of the first aspect, in a second possible implementation manner of the first aspect, the m wireless networks include Long Term Evolution LTE and a Universal Mobile Telecommunications System UMTS, a wireless network device in the LTE is an evolved NodeB eNB, a wireless network device in the UMTS is a radio network controller RNC, and the determining, by the decision device according to the throughput rates that can be separately obtained by the wireless multimode terminal in the m wireless networks, a wireless network that is suitable to be accessed by the wireless multimode terminal in connected mode includes:

when throughput rates that can be separately obtained by the wireless multimode terminal in the LTE and the UMTS are equal, randomly determining, by the decision device, one wireless network of the LTE and the UMTS as the wireless network that is suitable to be accessed by the wireless multimode terminal in connected mode; or when throughput rates that can be separately obtained by the wireless multimode terminal in the LTE and the UMTS are not equal, determining, by the decision device, a wireless network corresponding to a throughput rate with a relatively large value as the wireless network that is suitable to be accessed by the wireless multimode terminal in connected mode.

According to a second aspect, an embodiment of the present invention provides a method for admission in connected mode, including:

determining, by a wireless network device, a throughput rate that can be obtained by a wireless multimode terminal in a wireless network to which the wireless network device belongs; and sending, by the wireless network device, the determined throughput rate to a decision device, so that the decision device determines, according to the throughput rate, a wireless network that is suitable to be accessed by the wireless multimode terminal in connected mode.

With reference to the second aspect, in a first possible implementation manner of the second aspect, the wireless network device is an evolved NodeB eNB, the wireless network to which the wireless network device belongs is Long Term Evolution LTE, and the determining, by an eNB, a throughput rate that can be obtained by a wireless multimode terminal in LTE includes:

determining, by the eNB, a signal to interference plus noise ratio SINR of the wireless multimode terminal according to reference signal received quality RSRQ of the wireless multimode terminal and a resource block RB utilization rate of a first cell to be accessed by the wireless multimode terminal, where the first cell is a cell of the eNB;

determining, by the eNB, a transport block size index TBS_INDEX and transmission efficiency of the wireless multimode terminal according to the SINR of the wireless multimode terminal; and determining, by the eNB according to a load status parameter of the eNB, and the TBS_INDEX and the transmission efficiency of the wireless multimode terminal, the throughput rate that can be obtained by the wireless multimode terminal in the LTE.

With reference to the first possible implementation manner of the second aspect, in a second possible implementation manner of the second aspect, the determining, by the eNB, a SINR of the wireless multimode terminal according to RSRQ of the wireless multimode terminal and an RB utilization rate of a first cell to be accessed by the wireless multimode terminal includes:

calculating, by the eNB, the SINR of the wireless multimode terminal according to a formula: $RSRQ=-10 \log(2+10\eta)-10 \log(1+1/SINR)$, where $\eta$ is the RB utilization rate of the first cell to be accessed by the wireless multimode terminal.

With reference to the first possible implementation manner of the second aspect and/or the second possible implementation manner of the second aspect, in a third possible implementation manner of the second aspect, the determining, by the eNB according to a load status parameter of the eNB, and the TBS_INDEX and the transmission efficiency of the wireless multimode terminal, the throughput rate that can be obtained by the wireless multimode terminal in the LTE includes:

calculating, by the eNB, the throughput rate that can be obtained by the wireless multimode terminal in the LTE according to the following formula:

$$\{TP_{LTE}=(n_{RE}/n_{RB}) \times n_{RB} \times E/1000 \; n_{RE}/n_{RB}=(N_1-N_2) \times 12-N_{RE}, \text{ where}$$

$TP_{LTE}$ is the throughput rate that can be obtained by the wireless multimode terminal in the LTE; $n_{RB}$ is a quantity of idle RBs of the eNB; $n_{RE}$ is a quantity of idle resource elements REs on the idle RBs of the eNB; E is the transmission efficiency of the wireless multimode terminal; $N_1$ is a quantity of orthogonal frequency division multiplexing OFDM symbols included in each subframe; $N_2$ is a quantity of OFDM symbols occupied by a physical downlink control channel PDCCH in each subframe; and $N_{RE}$ is a quantity of REs occupied by pilot symbols on the idle RBs of the eNB.

With reference to the second aspect, in a fourth possible implementation manner of the second aspect, the wireless network device is a radio network controller RNC, the wireless network to which the wireless network device belongs is a Universal Mobile Telecommunications System UMTS, and the determining, by an RNC, a throughput rate that can be obtained by a wireless multimode terminal in a UMTS includes:

determining, by the RNC, a channel quality indicator CQI estimation value of the wireless multimode terminal and a quantity of idle codes of a second cell to be accessed by the wireless multimode terminal, where the second cell is a cell of the RNC;

determining, by the RNC, a throughput rate of the second cell according to the CQI estimation value of the wireless multimode terminal and the quantity of idle codes of the second cell to be accessed by the wireless multimode terminal; and determining, by the RNC according to the throughput rate of the second cell and a quantity of wireless multimode terminals connected to the second cell, the throughput rate that can be obtained by the wireless multimode terminal in the UMTS.

With reference to the fourth possible implementation manner of the second aspect, in a fifth possible implementation manner of the second aspect, the determining, by the RNC, a CQI estimation value of the wireless multimode terminal includes:

calculating, by the RNC, an arithmetic average of CQIs of all High Speed Downlink Packet Access HSDPA terminals in the second cell for a current statistical period;

performing, by the RNC, $\alpha$ filtering on the arithmetic average of the CQIs to obtain a CQI filtering value for the current statistical period; and determining, by the RNC, the CQI filtering value for the current statistical period as the CQI estimation value of the wireless multimode terminal.

With reference to the fifth possible implementation manner of the second aspect, in a sixth possible implementation manner of the second aspect, the performing, by the RNC, $\alpha$ filtering on the arithmetic average of the CQIs to obtain a CQI filtering value for the current statistical period includes:

performing, by the RNC according to the following formula, the $\alpha$ filtering on the arithmetic average of the CQIs to obtain the CQI filtering value for the current statistical period:

$$CQI_{filt\_n}=(1-\alpha) \times CQI_{filt\_n-1}+\alpha \times CQI_{aver\_n}, \text{ where}$$

$CQI_{filt\_n}$ is the CQI filtering value for the current statistical period; $CQI_{aver\_n-1}$ is a CQI filtering value for a statistical period preceding the current statistical period; $CQI_{aver\_n}$ is the arithmetic average of the CQIs for the current statistical period; and $\alpha$ is a filtering coefficient.

With reference to the fourth possible implementation manner of the second aspect and/or the fifth possible implementation manner of the second aspect and/or the sixth possible implementation manner of the second aspect, in a seventh possible implementation manner of the second aspect, the determining, by the RNC, a quantity of idle codes of a second cell includes:

obtaining, by the RNC by means of calculation, the quantity of idle codes of the second cell by using the following formula: the quantity of idle codes of the second cell=a total quantity of codes that can be used in the second cell–a quantity of codes occupied by an R99 terminal–a quantity of codes occupied by a common signaling channel.

With reference to the fourth possible implementation manner of the second aspect and/or the fifth possible implementation manner of the second aspect and/or the sixth possible implementation manner of the second aspect and/or the seventh possible implementation manner of the second aspect, in an eighth possible implementation manner of the second aspect, the determining, by the RNC according to the throughput rate of the second cell and a quantity of wireless multimode terminals connected to the second cell, the throughput rate that can be obtained by the wireless multimode terminal in the UMTS includes:

determining, by the RNC by using the following formula, the throughput rate that can be obtained by the wireless multimode terminal in the UMTS: the throughput rate that can be obtained by the wireless multimode terminal in the UMTS=the throughput rate of the second cell/the quantity of wireless multimode terminals connected to the second cell.

According to a third aspect, an embodiment of the present invention provides a decision device for admission in connected mode, including:

a receiving unit, configured to receive throughput rates that are separately sent by wireless network devices in m wireless networks and can be separately obtained by a wireless multimode terminal in the m wireless networks, where the m wireless networks are wireless networks that can be currently accessed by the wireless multimode terminal, and m≥2; and a network determining unit, configured to determine, according to the throughput rates that are received by the receiving unit and can be separately obtained by the wireless multimode terminal in the m wireless networks, a wireless network that is suitable to be accessed by the wireless multimode terminal in connected mode.

With reference to the third aspect, in a first possible implementation manner of the third aspect, the network determining unit is specifically configured to: when the throughput rates that can be separately obtained by the wireless multimode terminal in the m wireless networks are completely equal, randomly determine, by the decision device, one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determine, by the decision device, a wireless network corresponding to the throughput rate with the largest value as the wireless network that is suitable to be accessed by the wireless multimode terminal in connected mode, or if a quantity of throughput rates with a largest value is greater than 1, randomly determine, by the decision device, one wireless network of wireless networks corresponding to the throughput rates with the largest value as the wireless network that is suitable to be accessed by the wireless multimode terminal in connected mode.

With reference to the first possible implementation manner of the third aspect, in a second possible implementation manner of the third aspect, the m wireless networks include Long Term Evolution LTE and a Universal Mobile Telecommunications System UMTS, a wireless network device in the LTE is an evolved NodeB eNB, a wireless network device in the UMTS is a radio network controller RNC, and the network determining unit is specifically configured to: when throughput rates that can be separately obtained by the wireless multimode terminal in the LTE and the UMTS are equal, randomly determine one wireless network of the LTE and the UMTS as the wireless network that is suitable to be accessed by the wireless multimode terminal in connected mode; or when throughput rates that can be separately obtained by the wireless multimode terminal in the LTE and the UMTS are not equal, determine a wireless network corresponding to a throughput rate with a relatively large value as the wireless network that is suitable to be accessed by the wireless multimode terminal in connected mode.

According to a fourth aspect, an embodiment of the present invention provides an apparatus for admission in connected mode, including:

a throughput rate determining unit, configured to determine a throughput rate that can be obtained by a wireless multimode terminal in a wireless network to which a wireless network device belongs; and a sending unit, configured to send the throughput rate determined by the throughput rate determining unit to a decision device, so that the decision device determines, according to the throughput rate, a wireless network that is suitable to be accessed by the wireless multimode terminal in connected mode.

With reference to the second aspect, in a first possible implementation manner of the second aspect, the wireless network device is an evolved NodeB eNB, the wireless network to which the wireless network device belongs is Long Term Evolution LTE, and the throughput rate determining unit includes:

a first determining subunit, configured to determine a signal to interference plus noise ratio SINR of the wireless multimode terminal according to reference signal received quality RSRQ of the wireless multimode terminal and a resource block RB utilization rate of a first cell to be accessed by the wireless multimode terminal, where the first cell is a cell of the eNB;

a second determining subunit, configured to determine a transport block size index TBS_INDEX and transmission efficiency of the wireless multimode terminal according to the SINR of the wireless multimode terminal; and a third determining subunit, configured to determine, according to a load status parameter of the eNB, and the TBS_INDEX and the transmission efficiency of the wireless multimode terminal, the throughput rate that can be obtained by the wireless multimode terminal in the LTE.

With reference to the first possible implementation manner of the second aspect, in a second possible implementation manner of the second aspect, the first determining subunit is specifically configured to calculate the SINR of the wireless multimode terminal according to a formula: $RSRQ=-10\log(2+10\eta)-10\log(1+1/SINR)$, where $\eta$ is the RB utilization rate of the first cell to be accessed by the wireless multimode terminal.

With reference to the first possible implementation manner of the second aspect and/or the second possible implementation manner of the second aspect, in a third possible implementation manner of the second aspect, the third determining subunit is specifically configured to calculate the throughput rate that can be obtained by the wireless multimode terminal in the LTE according to the following formula:

$$\{TP_{LTE}=(n_{RE}/n_{RB})\times n_{RB}\times E/1000 \ n_{RE}/n_{RB}=(N_1-N_2)\times 12-N_{RE}, \text{where}$$

$TP_{LTE}$ is the throughput rate that can be obtained by the wireless multimode terminal in the LTE; $n_{RB}$ is a quantity of idle RBs of the eNB; $n_{RE}$ is a quantity of idle resource elements REs on the idle RBs of the eNB; E is the transmission efficiency of the wireless multimode terminal; $N_1$ is a quantity of orthogonal frequency division multiplexing OFDM symbols included in each subframe; $N_2$ is a quantity of OFDM symbols occupied by a physical downlink control channel PDCCH in each subframe; and $N_{RE}$ is a quantity of REs occupied by pilot symbols on the idle RBs of the eNB.

With reference to the second aspect, in a fourth possible implementation manner of the second aspect, the wireless network device is an RNC, the wireless network to which the wireless network device belongs is a UMTS, and the throughput rate determining unit includes:

a fourth determining subunit, configured to determine a channel quality indicator CQI estimation value of the wireless multimode terminal and a quantity of idle codes of a second cell to be accessed by the wireless multimode terminal, where the second cell is a cell of the RNC;

a fifth determining subunit, configured to determine a throughput rate of the second cell according to the CQI estimation value of the wireless multimode terminal and the quantity of idle codes of the second cell to be accessed by the wireless multimode terminal; and a sixth determining subunit, configured to determine, according to the throughput rate of the second cell and a quantity of wireless multimode terminals connected to the second cell, the throughput rate that can be obtained by the wireless multimode terminal in the UMTS.

With reference to the fourth possible implementation manner of the second aspect, in a fifth possible implementation manner of the second aspect, the fourth determining subunit includes:

a first calculating module, configured to calculate an arithmetic average of CQIs of all High Speed Downlink Packet Access HSDPA terminals in the second cell in a current statistical period;

a filtering module, configured to perform α filtering on the arithmetic average of the CQIs to obtain a CQI filtering value in the current statistical period; and a determining module, configured to determine the CQI filtering value in the current statistical period as the CQI estimation value of the wireless multimode terminal.

With reference to the fifth possible implementation manner of the second aspect, in sixth possible implementation manner of the second aspect, the filtering module is specifically configured to:

perform, according to the following formula, the α filtering on the arithmetic average of the CQIs to obtain the CQI filtering value in the current statistical period:

$CQI_{filt\_n} = (1-\alpha) \times CQI_{filt\_n-1} + \alpha \times CQI_{aver\_n}$, where $CQI_{filt\_n}$ is the CQI filtering value for the current statistical period; $CQI_{aver\_n-1}$ is a CQI filtering value for a statistical period preceding the current statistical period; $CQI_{aver\_n}$ is the arithmetic average of the CQIs for the current statistical period; and α is a filtering coefficient.

With reference to the fourth possible implementation manner of the second aspect and/or the fifth possible implementation manner of the second aspect and/or the sixth possible implementation manner of the second aspect, in a seventh possible implementation manner of the second aspect, the fourth determining subunit includes:

a calculating module, configured to obtain, by means of calculation, the quantity of idle codes of the second cell by using the following formula: the quantity of idle codes of the second cell=a total quantity of codes that can be used in the second cell−a quantity of codes occupied by an R99 terminal−a quantity of codes occupied by a common signaling channel.

With reference to the fourth possible implementation manner of the second aspect and/or the fifth possible implementation manner of the second aspect and/or the sixth possible implementation manner of the second aspect and/or the seventh possible implementation manner of the second aspect, in an eighth possible implementation manner of the second aspect, the sixth determining subunit is specifically configured to determine, by using the following formula, the throughput rate that can be obtained by the wireless multimode terminal in the UMTS: the throughput rate that can be obtained by the wireless multimode terminal in the UMTS=the throughput rate of the second cell/the quantity of wireless multimode terminals connected to the second cell.

In the embodiments of the present invention, a decision device receives throughput rates that are separately sent by wireless network devices in m wireless networks and can be separately obtained by a wireless multimode terminal in the m wireless networks, where the m wireless networks are wireless networks that can be currently accessed by the wireless multimode terminal, and m≥2; and the decision device determines, according to the throughput rates that can be separately obtained by the wireless multimode terminal in the m wireless networks, a wireless network that is suitable to be accessed by the wireless multimode terminal in connected mode. In this way, the decision device determines, according to the throughput rates that can be separately obtained by the wireless multimode terminal in the m wireless networks, the wireless network that is suitable to be accessed by the wireless multimode terminal in connected mode, which no longer allows the wireless multimode terminal to preferentially camp on or allows preferential admission to a wireless network, so that a wireless network to be accessed by the wireless multimode terminal in connected mode can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1A:
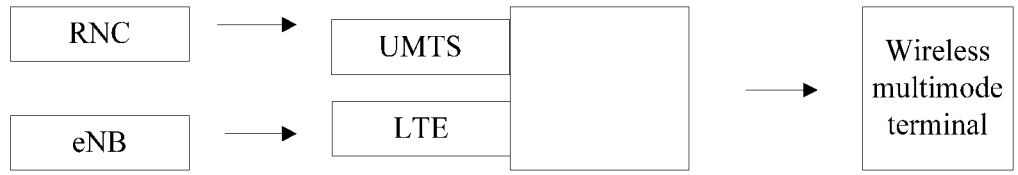
FIG. 1A is a diagram of an instance of network selection in a case in which two types of wireless networks coexist.

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

A wireless multimode terminal in the embodiments of the present invention refers to a terminal that supports access to at least two wireless networks; in the embodiments of the present invention, a quantity of wireless networks that can be accessed by the wireless multimode terminal is set to M, where M is a natural number greater than 1, and a quantity of wireless networks that can be currently accessed by the wireless multimode terminal is set to m, where 2≤m≤M; a device that is in each wireless network and accepts access of the wireless multimode terminal to the wireless network is referred to as a wireless network device, and when a quantity of wireless networks is m, a quantity of wireless network devices that accept access of the wireless multimode terminal to the wireless networks may also be m. The wireless networks that can be currently accessed by the wireless multimode terminal are a subset of wireless networks access to which can be supported by the wireless multimode terminal. The m wireless networks may include but are not limited to LTE and a UMTS. For example, if a value of m is 2, the wireless networks may be the LTE and the UMTS, a wireless network device in the LTE may be an evolved NodeB (eNB, evolved Node B), and a wireless network device in the UMTS may be a radio network controller (RNC, Radio Network Controller).

In the embodiments of the present invention, a device that executes the method for admission in connected mode in the present invention is referred to as decision device. The decision device may be an independent network device independent of the m wireless network devices (devices that are in the m wireless networks that can be currently accessed by the wireless multimode terminal and accept access of the wireless multimode terminal to the corresponding wireless networks), or may be located in a wireless network device of the m wireless network devices to serve as a part of the wireless network device. When the decision device is the independent network device independent of the m wireless network devices, communication may be performed between the decision device and each wireless network device by means of external communication between the decision device and each wireless network device; when the decision device is located in a wireless network device, communication may be performed, by means of internal communication, between the decision device and the wireless network device to which the decision device belongs, and communication may be performed between the decision device and another wireless network device by means of external communication between the decision device and the another wireless network device.

Based on the foregoing description, implementation of the method and apparatus for admission in connected mode according to the embodiments of the present invention is further described in detail in the following.

Figure 1:
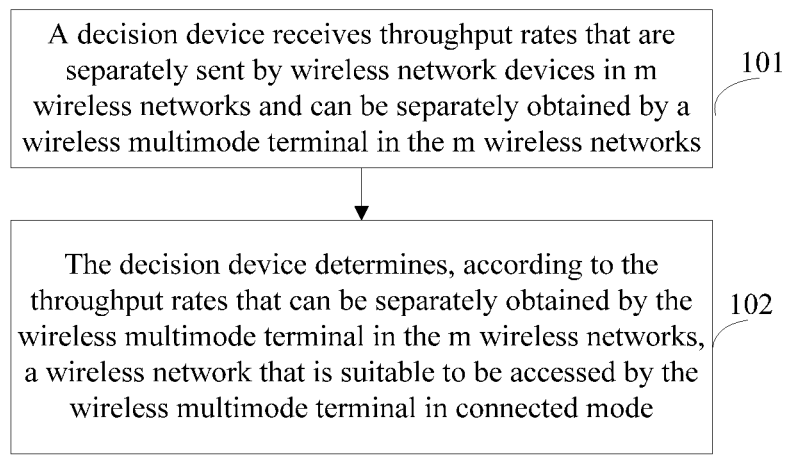
FIG. 1 is a schematic diagram of a first embodiment of a method for admission in connected mode according to the present invention.

Referring to FIG. 1, FIG. 1 is a schematic diagram of a first embodiment of a method for admission in connected mode according to the present invention. The method includes:

Step 101: A decision device receives throughput rates that are separately sent by wireless network devices in m wireless networks and can be separately obtained by a wireless multimode terminal in the m wireless networks, where the m wireless networks are wireless networks that can be currently accessed by the wireless multimode terminal, and m≥2.

Step 102: The decision device determines, according to the throughput rates that can be separately obtained by the wireless multimode terminal in the m wireless networks, a wireless network that is suitable to be accessed by the wireless multimode terminal in connected mode.

In a possible implementation manner, the determining, by the decision device according to the throughput rates that can be separately obtained by the wireless multimode terminal in the m wireless networks, a wireless network that is suitable to be accessed by the wireless multimode terminal in connected mode may include:

when the throughput rates that can be separately obtained by the wireless multimode terminal in the m wireless networks are completely equal, randomly determining one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determining, by the decision device, a wireless network corresponding to the throughput rate with the largest value as the wireless network that is suitable to be accessed by the wireless multimode terminal in connected mode, or if a quantity of throughput rates with a largest value is greater than 1, randomly determining, by the decision device, one wireless network of wireless networks corresponding to the throughput rates with the largest value as the wireless network that is suitable to be accessed by the wireless multimode terminal in connected mode.

In this embodiment, a decision device determines, according to throughput rates that can be obtained by a wireless multimode terminal in m wireless networks, a wireless network that is suitable to be accessed by the wireless multimode terminal in connected mode, which no longer allows the wireless multimode terminal to preferentially camp on or allows preferential admission to a wireless network, so that a wireless network that is suitable to be accessed by the wireless multimode terminal in connected mode can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

Figure 2:
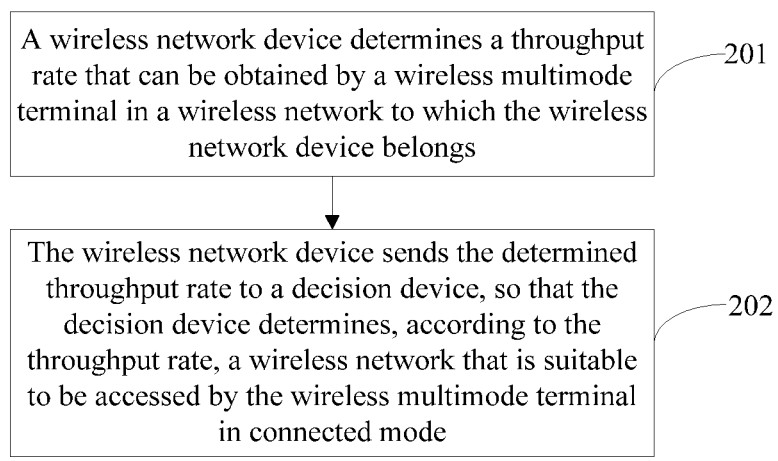
FIG. 2 is a schematic diagram of a second embodiment of a method for admission in connected mode according to the present invention.

Referring to FIG. 2, FIG. 2 is a schematic diagram of a second embodiment of a method for admission in connected mode according to the present invention. The method includes:

Step 201: A wireless network device determines a throughput rate that can be obtained by a wireless multimode terminal in a wireless network to which the wireless network device belongs.

The wireless network device may be an eNB, and correspondingly, the wireless network to which the wireless network device belongs may be LTE. Alternatively, the wireless network device may be an RNC, and correspondingly, the wireless network to which the wireless network device belongs may be a UMTS.

Step 202: The wireless network device sends the determined throughput rate to a decision device, so that the decision device determines, according to the throughput rate, a wireless network that is suitable to be accessed by the wireless multimode terminal in connected mode.

In this embodiment, a wireless network device calculates a throughput rate that can be obtained by a wireless multimode terminal and sends the throughput rate obtained by means of calculation to a decision device, so that the decision device determines, according to the throughput rate, a wireless network that is suitable to be accessed by the wireless multimode terminal in connected mode. In this way, the decision device determines, according to a throughput rate that can be obtained by the wireless multimode terminal in each wireless network, a wireless network to be accessed by the wireless multimode terminal in connected mode, which no longer allows the wireless multimode terminal to preferentially camp on or allows preferential admission to a wireless network, so that a wireless network to be accessed by the wireless multimode terminal can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

Figure 3:
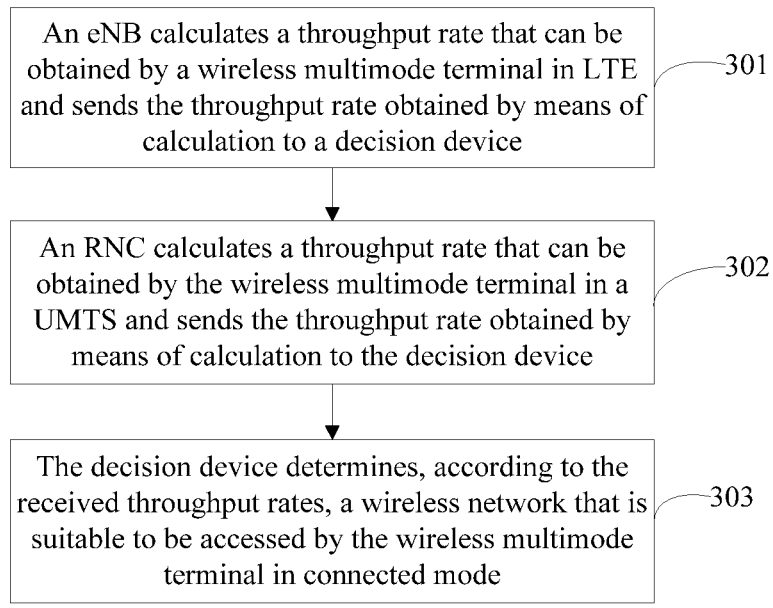
FIG. 3 is a schematic diagram of a third embodiment of a method for admission in connected mode according to the present invention.

Referring to FIG. 3, FIG. 3 is a schematic diagram of a third embodiment of a method for admission in connected mode according to the present invention. In this embodiment, an example is used in which a value of m is 2, and the 2 wireless networks are LTE and a UMTS. The method includes:

Step 301: An eNB determines a throughput rate that can be obtained by a wireless multimode terminal in the LTE and sends the determined throughput rate to a decision device.

In this embodiment of the present invention, the throughput rate that can be obtained by the wireless multimode terminal in the LTE may be specifically a throughput rate that can be obtained in a first cell to be accessed by the wireless multimode terminal in the LTE. Specifically, the determining, by an eNB, a throughput rate that can be obtained by a wireless multimode terminal in the LTE may include:

determining, by the eNB, a signal to interference plus noise ratio (SINR, Signal to Interference plus Noise Ratio) of the wireless multimode terminal according to reference signal received quality (RSRQ, Reference Signal Receiving Quality) of the wireless multimode terminal and a resource block (RB, Resource Block) utilization rate of the first cell to be accessed by the wireless multimode terminal;

determining, by the eNB, a transport block size index (TBS_INDEX, Transport Block Size Index) and transmission efficiency (Efficiency) of the wireless multimode terminal according to the SINR of the wireless multimode terminal; and determining, by the eNB according to a load status parameter of the eNB, and the TBS_INDEX and the transmission efficiency of the wireless multimode terminal, the throughput rate that can be obtained by the wireless multimode terminal in the first cell, where the throughput rate that can be obtained by the wireless multimode terminal in the first cell and is determined in this step is also the throughput rate that can be obtained by the wireless multimode terminal in the LTE.

When determining the SINR of the wireless multimode terminal according to the RSRQ of the wireless multimode terminal and the RB utilization rate of the first cell to be accessed by the wireless multimode terminal, the eNB may obtain, by means of calculation, the SINR of the wireless multimode terminal by using the following formula:

$$RSRQ = -10 \log(2+10\eta) - 10 \log(1+1/SINR); \text{ where}$$

$\eta$ is the RB utilization rate of the first cell to be accessed by the wireless multimode terminal.

The first cell to be accessed by the wireless multimode terminal is a cell of the eNB.

The eNB may determine, for the wireless multimode terminal, which cell is specifically the first cell to be accessed by the wireless multimode terminal, and how the eNB specifically determines is not limited in the present invention.

In an actual application, different SINRs are corresponding to TBS_INDEXs and transmission efficiency of different wireless multimode terminals, as shown in Table 1 for example. Therefore, when determining the TBS_INDEX and the transmission efficiency of the wireless multimode terminal according to the SINR of the wireless multimode terminal, the eNB may directly search the following Table 1 according to the SINR to obtain a TBS_INDEX and transmission efficiency that are corresponding to the SINR, and the TBS_INDEX and the transmission efficiency that are corresponding to the SINR in Table 1 are the TBS_INDEX and the transmission efficiency of the wireless multimode terminal. Table 1 in the following is merely used as an example and is not used to limit a correspondence between an SINR, a TBS_INDEX, and transmission efficiency.

TABLE 1

| TBS_INDEX | Efficiency | SINR(dB) |
|---|---|---|
| 0 | 0.2344 | SINR1 |
| 1 | 0.3057 | SINR2 |
| 2 | 0.377 | SINR3 |
| 3 | 0.4893 | SINR4 |
| 4 | 0.6016 | SINR5 |
| 5 | 0.7393 | SINR6 |
| 6 | 0.877 | SINR7 |
| 7 | 1.0264 | SINR8 |
| 8 | 1.1758 | SINR9 |
| 9 | 1.3262 | SINR10 |
| 9 | 1.3262 | SINR11 |
| 10 | 1.4766 | SINR12 |
| 11 | 1.69535 | SINR13 |
| 12 | 1.9141 | SINR14 |
| 13 | 2.1602 | SINR15 |
| 14 | 2.4063 | SINR16 |
| 15 | 2.5684 | SINR17 |
| 15 | 2.5684 | SINR18 |
| 16 | 2.7305 | SINR19 |
| 17 | 3.0264 | SINR20 |
| 18 | 3.3223 | SINR21 |
| 19 | 3.6123 | SINR22 |

TABLE 1-continued

| TBS_INDEX | Efficiency | SINR(dB) |
|---|---|---|
| 20 | 3.9023 | SINR23 |
| 21 | 4.21285 | SINR24 |
| 22 | 4.5234 | SINR25 |
| 23 | 4.8193 | SINR26 |
| 24 | 5.1152 | SINR27 |
| 25 | 5.33495 | SINR28 |
| 26 | 5.5547 | SINR29 |

When determining, according to the load status parameter of the eNB, and the TBS_INDEX and the transmission efficiency of the wireless multimode terminal, the throughput rate that can be obtained by the wireless multimode terminal in the LTE, the eNB may calculate, by using the following formula, the throughput rate that can be obtained by the wireless multimode terminal in the LTE:

$$\{TP_{LTE}=(n_{RE}/n_{RB})\times n_{RB}\times E/1000 \; n_{RE}/n_{RB}=(N_1-N_2)\times 12-N_{RE}, \text{where}$$

$TP_{LTE}$ is the throughput rate that can be obtained by the wireless multimode terminal in the LTE; $n_{RB}$ is a quantity of idle RBs of the eNB; $n_{RE}$ is a quantity of idle resource elements (RE, Resource Element) on the idle RBs of the eNB; E is the transmission efficiency of the wireless multimode terminal; $N_1$ is a quantity of OFDM symbols included in each subframe; $N_2$ is a quantity of orthogonal frequency division multiplexing (OFDM, Orthogonal Frequency Division Multiplexing) symbols occupied by a physical downlink control channel in each subframe; and $N_{RE}$ is a quantity of REs occupied by pilot symbols on the idle RBs of the eNB.

The eNB generally stores information, such as the RSRQ of the wireless multimode terminal, the RB utilization rate of the first cell to be accessed by the wireless multimode terminal, and Table 1, and when performing the foregoing step, the eNB only needs to directly acquire corresponding information from the eNB.

Step 302: An RNC determines a throughput rate that can be obtained by the wireless multimode terminal in the UMTS and sends the determined throughput rate to the decision device.

In this embodiment of the present invention, the throughput rate that can be obtained by the wireless multimode terminal in the UMTS may be specifically a throughput rate that can be obtained in a second cell to be accessed by the wireless multimode terminal in the UMTS. Specifically, the determining, by an RNC, a throughput rate that can be obtained by the wireless multimode terminal in the UMTS may include:

determining, by the RNC, a channel quality indicator (CQI, Channel Quality Indicator) estimation value of the wireless multimode terminal and a quantity of idle codes of the second cell to be accessed by the radio multimode terminal;

determining, by the RNC, a throughput rate of the second cell according to the CQI estimation value of the wireless multimode terminal and the quantity of idle codes of the second cell to be accessed by the RNC; and determining, by the RNC according to the throughput rate of the second cell and a quantity of wireless multimode terminals connected to the second cell, the throughput rate that can be obtained by the wireless multimode terminal in the second cell, where the throughput rate that can be obtained by the wireless multimode terminal in the second cell and is determined in this step is also the throughput rate that can be obtained by the wireless multimode terminal in the UMTS.

The second cell to be accessed by the radio multimode terminal is a cell of the RNC.

The RNC may determine, for the wireless multimode terminal, which cell is specifically the second cell to be accessed by the wireless multimode terminal, and how the RNC specifically determines is not limited in the present invention.

The determining, by the RNC, a CQI estimation value of the wireless multimode terminal may include:

calculating, by the RNC, an arithmetic average of CQIs of all High Speed Downlink Packet Access (HSDPA, High Speed Downlink Packet Access) terminals in the second cell in a current statistical period, where a calculation formula may be $$CQI_{aver} = \frac{CQI_1 + CQI_2 + \ldots + CQI_Q}{Q},$$

where $CQI_{aver}$ is the arithmetic average of CQIs of all the HSDPA terminals in the second cell in the current statistical period, Q is a total quantity of HSDPA terminals, $CQI_1$, $CQI_2$, . . . and $CQI_3$ are CQIs of Q HSDPA terminals separately, and Q≥1;

performing, by the RNC, α filtering on the arithmetic average of the CQIs to obtain a CQI filtering value in the current statistical period; and determining, by the RNC, the CQI filtering value in the current statistical period as the CQI estimation value of the wireless multimode terminal.

A specific time length of a statistical period is not limited in the present invention and may be, for example, 10 s; a statistical moment may be set in each statistical period, so as to calculate a CQI reference value in the statistical period, and the statistical moment may be but is not limited to an initial moment of the statistical period.

A calculation formula based on which the RNC performs the α filtering on the arithmetic average of the CQIs may be:

$$CQI_{filt\_n}=(1-\alpha)\times CQI_{filt\_n-1}+\alpha\times CQI_{aver\_n}, \text{where}$$

$CQI_{filt\_n}$ is the CQI filtering value in the current statistical period; $CQI_{aver\_n-1}$ is a CQI filtering value in a statistical period preceding the current statistical period; $CQI_{aver\_n}$ is the arithmetic average of the CQIs in the current statistical period; and α is a filtering coefficient, where a value of α is not limited in the present invention and may be, for example, 0.1.

When determining the quantity of idle codes of the second cell, the RNC may obtain, by means of calculation, the quantity of idle codes of the second cell by using the following formula:

the quantity of idle codes of the second cell=a total quantity of codes that can be used in the second cell–a quantity of codes occupied by an R99 terminal–a quantity of codes occupied by a common signaling channel.

The determining, by the RNC, a throughput rate of the second cell according to the CQI estimation value of the wireless multimode terminal and the quantity of idle codes of the second cell to be accessed by the radio multimode terminal may include:

searching, by the RNC according to the CQI estimation value of the wireless multimode terminal and the quantity of idle codes of the second cell, Table 2 in the following to obtain a transport block size (TBS, Transport Block Size) of the second cell; and calculating the throughput rate of the second cell according to the TBS of the second cell, where a formula for calculating the throughput rate of the second cell and the TBS of the second cell may be: the throughput rate of the second cell=TBS/a transmission time interval (TTI, Transmission Time Interval), where a TTI corresponding to HSDPA is generally 2 ms.

wireless network of the LTE and the UMTS is randomly determined as the wireless network that is suitable to be accessed by the wireless multimode terminal in connected mode.

For example, of the two received throughput rates, if the throughput rate that can be obtained by the wireless multimode terminal in the LTE is greater than the throughput rate that can be obtained by the wireless multimode terminal in the UMTS, it is determined that the wireless multimode terminal is suitable to access the LTE in connected mode;

TABLE 2

| | | Quantity of Codes | | | | | | | | | | | | | | |
|---|---|---|---|---|---|---|---|---|---|---|---|---|---|---|---|---|
| TBS | | 1 | 2 | 3 | 4 | 5 | 6 | 7 | 8 | 9 | 10 | 11 | 12 | 13 | 14 | 15 |
| CQI | 0 | N/A | N/A | N/A | N/A | N/A | N/A | N/A | N/A | N/A | N/A | N/A | N/A | N/A | N/A | N/A |
| | 1 | 136 | 0 | 0 | 0 | 0 | 0 | 0 | 0 | 0 | 0 | 0 | 0 | 0 | 0 | 0 |
| | 2 | 176 | 0 | 0 | 0 | 0 | 0 | 0 | 0 | 0 | 0 | 0 | 0 | 0 | 0 | 0 |
| | 3 | 232 | 0 | 0 | 0 | 0 | 0 | 0 | 0 | 0 | 0 | 0 | 0 | 0 | 0 | 0 |
| | 4 | 320 | 0 | 0 | 0 | 0 | 0 | 0 | 0 | 0 | 0 | 0 | 0 | 0 | 0 | 0 |
| | 5 | 376 | 0 | 0 | 0 | 0 | 0 | 0 | 0 | 0 | 0 | 0 | 0 | 0 | 0 | 0 |
| | 6 | 464 | 0 | 0 | 0 | 0 | 0 | 0 | 0 | 0 | 0 | 0 | 0 | 0 | 0 | 0 |
| | 7 | 536 | 648 | 0 | 0 | 0 | 0 | 0 | 0 | 0 | 0 | 0 | 0 | 0 | 0 | 0 |
| | 8 | 616 | 792 | 0 | 0 | 0 | 0 | 0 | 0 | 0 | 0 | 0 | 0 | 0 | 0 | 0 |
| | 9 | 648 | 928 | 1040 | 0 | 0 | 0 | 0 | 0 | 0 | 0 | 0 | 0 | 0 | 0 | 0 |
| | 10 | 824 | 1112 | 1264 | 1384 | 0 | 0 | 0 | 0 | 0 | 0 | 0 | 0 | 0 | 0 | 0 |
| | 11 | 952 | 1264 | 1488 | 1600 | 1712 | 0 | 0 | 0 | 0 | 0 | 0 | 0 | 0 | 0 | 0 |
| | 12 | 1096 | 1432 | 1744 | 1944 | 2048 | 2128 | 2168 | 0 | 0 | 0 | 0 | 0 | 0 | 0 | 0 |
| | 13 | 1264 | 1712 | 2016 | 2288 | 2456 | 2592 | 2580 | 2784 | 2832 | 0 | 0 | 0 | 0 | 0 | 0 |
| | 14 | 1384 | 1944 | 2288 | 2592 | 2832 | 3040 | 3152 | 3264 | 3384 | 3448 | 3512 | 0 | 0 | 0 | 0 |
| | 15 | 1536 | 2288 | 2736 | 2984 | 3328 | 3640 | 3840 | 3976 | 4120 | 4272 | 4352 | 4432 | 4512 | 4592 | 0 |
| | 16 | 1624 | 2456 | 2984 | 3328 | 3576 | 3912 | 4200 | 4432 | 4760 | 4848 | 4936 | 5024 | 5112 | 5208 |
| | 17 | 1712 | 2784 | 3384 | 3840 | 4200 | 4512 | 4760 | 5112 | 5392 | 5592 | 5792 | 5896 | 6112 | 6224 | 6336 |
| | 18 | 1744 | 2984 | 3704 | 4272 | 4672 | 5024 | 5296 | 5592 | 5896 | 6224 | 6448 | 6688 | 6808 | 7056 | 7184 |
| | 19 | 1808 | 3208 | 4120 | 4760 | 5296 | 5688 | 6008 | 6336 | 6568 | 6928 | 7312 | 7576 | 7856 | 7992 | 8288 |
| | 20 | 1808 | 3264 | 4432 | 5296 | 5896 | 6448 | 6808 | 7184 | 7576 | 7856 | 7992 | 8440 | 8744 | 9064 | 9392 |
| | 21 | 1840 | 3512 | 4760 | 5792 | 6568 | 7184 | 7712 | 8136 | 8592 | 8904 | 9224 | 9560 | 9736 | 10088 | 10456 |

A calculation formula based on which the RNC determines, according to the throughput rate of the second cell and the quantity of wireless multimode terminals connected to the second cell, the throughput rate that can be obtained by the wireless multimode terminal in the UMTS may be:

the throughput rate that can be obtained by the wireless multimode terminal in the UMTS=the throughput rate of the second cell/the quantity of wireless multimode terminals connected to the second cell.

A sequence of performing step 301 and step 302 is not limited.

The RNC generally stores parameters, such as the CQIs of the HSDPA terminals, α, the total quantity of codes that can be used by the second cell, the quantity of codes occupied by the R99 terminal, and the quantity of codes occupied by the common signaling channel, and when performing the foregoing step, the RNC only needs to directly acquire corresponding parameter information from the RNC.

Step 303: The decision device determines, according to the received throughput rates that can be separately obtained by the wireless network device in the UMTS and the LTE, a wireless network that is suitable to be accessed by the wireless multimode terminal in connected mode.

Specifically, if the throughput rates that can be obtained by the wireless multimode terminal in the LTE and the UMTS are not equal, a wireless network corresponding to a throughput rate with a relatively large value is determined as the wireless network that is suitable to be accessed by the wireless multimode terminal in connected mode.

If the throughput rates that can be obtained by the wireless multimode terminal in the LTE and the UMTS are equal, one otherwise, it is determined that the wireless multimode terminal is suitable to access the UMTS in connected mode.

In this embodiment, a decision device determines, according to throughput rates that can be obtained by a wireless multimode terminal in LTE and a UMTS, a network that is suitable to be accessed by the wireless multimode terminal in connected mode, which no longer allows the wireless multimode terminal to preferentially camp on or allows preferential admission to the LTE, so that a wireless network to be accessed by the wireless multimode terminal in connected mode can be properly determined, and configuration of network resources is optimized. Correspondingly, load of the LTE network is reduced, and communication quality is improved for wireless multimode terminals that access the LTE network.

The decision device in this embodiment may be an independent network device independent of the eNB and the RNC, or may be located in the eNB or the RNC to serve as a part of the eNB or the RNC. When the decision device is an independent network device independent of the eNB and the RNC, communication may be performed between the decision device and the eNB by means of external communication between the decision device and the eNB, and communication may be performed between the decision device and the RNC by means of external communication between the decision device and the RNC; when the decision device is located in the eNB, communication may be performed between the eNB and the decision device by means of internal communication, and communication may be performed between the decision device and the RNC by means of external communication between the decision device and the RNC; likewise, when the decision device is located in the RNC, communication may be performed between the RNC and the decision device by means of internal communication, and communication may be performed between the decision device and the eNB by means of external communication between the decision device and the eNB.

Figure 4:
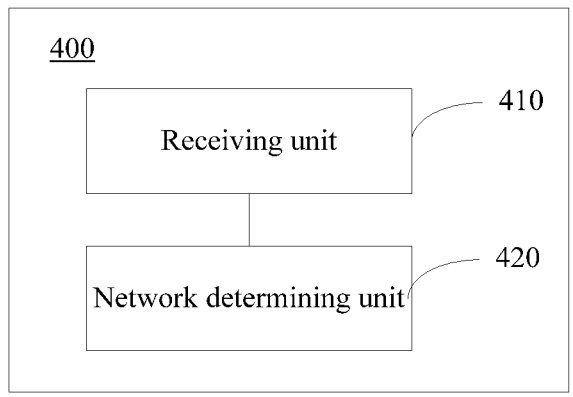
FIG. 4 is a schematic diagram of an embodiment of a decision device for admission in connected mode according to the present invention.

Referring to FIG. 4, FIG. 4 is a structural diagram of a decision device for admission in connected mode according to an embodiment of the present invention. A decision device 400 includes:

a receiving unit 410, configured to receive throughput rates that are separately sent by wireless network devices on m wireless networks and can be separately obtained by a wireless multimode terminal in the m wireless networks, where the m wireless networks are wireless networks that can be currently accessed by the wireless multimode terminal, and m≥2; and a network determining unit 420, configured to determine, according to the throughput rates that can be separately obtained by the wireless multimode terminal in the m wireless networks and are received by the receiving unit 410, a wireless network that is suitable to be accessed by the wireless multimode terminal in connected mode.

Optionally, the network determining unit 420 may be specifically configured to: when the throughput rates that can be separately obtained by the wireless multimode terminal in the m wireless networks are completely equal, randomly determine, by the decision device, one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determine, by the decision device, a wireless network corresponding to the throughput rate with the largest value as the wireless network that is suitable to be accessed by the wireless multimode terminal in connected mode, or if a quantity of throughput rates with a largest value is greater than 1, randomly determine, by the decision device, one wireless network of wireless networks corresponding to the throughput rates with the largest value as the wireless network that is suitable to be accessed by the wireless multimode terminal in connected mode.

Optionally, the m wireless networks may include LTE and a UMTS, a wireless network device in the LTE may be an eNB, a wireless network device in the UMTS may be an RNC, and the network determining unit 420 may be specifically configured to: when throughput rates that can be separately obtained by the wireless multimode terminal in the LTE and the UMTS are equal, randomly determine one wireless network of the LTE and the UMTS as the wireless network that is suitable to be accessed by the wireless multimode terminal in connected mode; or when throughput rates that can be separately obtained by the wireless multimode terminal in the LTE and the UMTS are not equal, determine a wireless network corresponding to a throughput rate with a relatively large value as the wireless network that is suitable to be accessed by the wireless multimode terminal in connected mode.

In this embodiment, a decision device determines, according to throughput rates that can be obtained by a wireless multimode terminal in m wireless networks, a wireless network that is suitable to be accessed by the wireless multimode terminal in connected mode, which no longer allows the wireless multimode terminal to preferentially camp on or allows preferential admission to a wireless network, so that a wireless network to be accessed by the wireless multimode terminal can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

Figure 5:
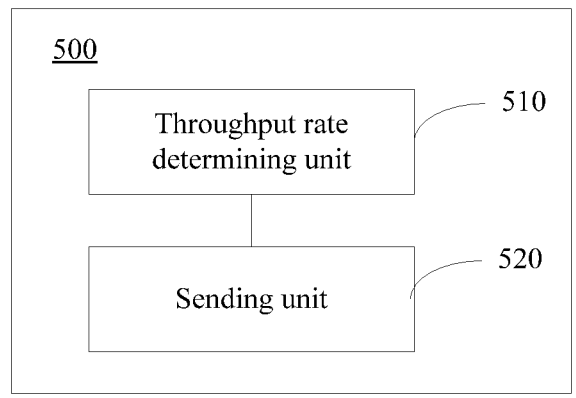
FIG. 5 is a schematic diagram of an embodiment of an apparatus for admission in connected mode according to the present invention.

Referring to FIG. 5, FIG. 5 is a structural diagram of another apparatus for admission in connected mode according to an embodiment of the present invention. The apparatus may be applicable to a wireless network device, and an apparatus 500 includes:

a throughput rate determining unit 510, configured to determine a throughput rate that can be obtained by a wireless multimode terminal in a wireless network to which the wireless network device belongs; and a sending unit 520, configured to send the throughput rate determined by the throughput rate determining unit 510 to a decision device, so that the decision device determines, according to the throughput rate, a wireless network that is suitable to be accessed by the wireless multimode terminal in connected mode.

Optionally, the wireless network device may be an eNB, the wireless network to which the wireless network device belongs may be LTE, and the throughput rate determining unit 510 may include:

a first determining subunit, configured to determine an SINR of the wireless multimode terminal according to RSRQ of the wireless multimode terminal and an RB utilization rate of a first cell to be accessed by the wireless multimode terminal, where the first cell is a cell of the eNB;

a second determining subunit, configured to determine a TBS_INDEX and transmission efficiency of the wireless multimode terminal according to the SINR of the wireless multimode terminal; and a third determining subunit, configured to determine, according to a load status parameter of the eNB, and the TBS_INDEX and the transmission efficiency of the wireless multimode terminal, the throughput rate that can be obtained by the wireless multimode terminal in the LTE.

Optionally, the first determining subunit may be specifically configured to calculate the SINR of the wireless multimode terminal according to a formula: $RSRQ=-10\log(2+10\eta)-10\log(1+1/SINR)$, where $\eta$ is the RB utilization rate of the first cell to be accessed by the wireless multimode terminal.

Optionally, the third determining subunit may be specifically configured to calculate the throughput rate that can be obtained by the wireless multimode terminal in the LTE according to the following formula:

$$\{TP_{LTE}=(n_{RE}/n_{RB})\times n_{RB}\times E/1000 \; n_{RE}/n_{RB}=(N_1-N_2)\times 12-N_{RE}, \text{ where}$$

$TP_{LTE}$ is the throughput rate that can be obtained by the wireless multimode terminal in the LTE; $n_{RB}$ is a quantity of idle RBs of the eNB; $n_{RE}$ is a quantity of idle REs on the idle RBs of the eNB; E is the transmission efficiency of the wireless multimode terminal; $N_1$ is a quantity of OFDM symbols included in each subframe; $N_2$ is a quantity of OFDM symbols occupied by a PDCCH in each subframe; and $N_{RE}$ is a quantity of REs occupied by pilot symbols on the idle RBs of the eNB.

Optionally, the wireless network device may be an RNC, the wireless network to which the wireless network device belongs may be a UMTS, and the throughput rate determining unit 510 may include:

a fourth determining subunit, configured to determine a CQI estimation value of the wireless multimode terminal and a quantity of idle codes of a second cell to be accessed by the wireless multimode terminal, where the second cell is a cell of the RNC;

a fifth determining subunit, configured to determine a throughput rate of the second cell according to the CQI estimation value of the wireless multimode terminal and the quantity of idle codes of the second cell to be accessed by the wireless multimode terminal; and a sixth determining subunit, configured to determine, according to the throughput rate of the second cell and a quantity of wireless multimode terminals connected to the second cell, the throughput rate that can be obtained by the wireless multimode terminal in the UMTS.

Optionally, the fourth determining subunit may include:

a first calculating module, configured to calculate an arithmetic average of CQIs of all HSDPA terminals in the second cell in a current statistical period;

a filtering module, configured to perform α filtering on the arithmetic average of the CQIs to obtain a CQI filtering value in the current statistical period; and a determining module, configured to determine the CQI filtering value in the current statistical period as the CQI estimation value of the wireless multimode terminal.

Optionally, the filtering module may be specifically configured to:

perform, according to the following formula, the α filtering on the arithmetic average of the CQIs to obtain the CQI filtering value in the current statistical period:

$$CQI_{filt\_n}=(1-\alpha)\times CQI_{filt\_n-1}+\alpha\times CQI_{aver\_n}, \text{ where}$$

$CQI_{filt\_n}$ is the CQI filtering value in the current statistical period; $CQI_{aver\_n-1}$ is a CQI filtering value in a statistical period preceding the current statistical period; $CQI_{aver\_n}$ is the arithmetic average of the CQIs in the current statistical period; and α is a filtering coefficient.

Optionally, the fourth determining subunit may include:

a calculating module, configured to obtain, by means of calculation, the quantity of idle codes of the second cell by using the following formula: the quantity of idle codes of the second cell=a total quantity of codes that can be used in the second cell−a quantity of codes occupied by an R99 terminal−a quantity of codes occupied by a common signaling channel.

Optionally, the sixth determining subunit may be specifically configured to determine, by using the following formula, the throughput rate that can be obtained by the wireless multimode terminal in the UMTS: the throughput rate that can be obtained by the wireless multimode terminal in the UMTS=the throughput rate of the second cell/the quantity of wireless multimode terminals connected to the second cell.

In this embodiment, an apparatus calculates a throughput rate that can be obtained by a wireless multimode terminal and sends the throughput rate obtained by means of calculation to a decision device, so that the decision device determines, according to the throughput rate, a wireless network to be accessed by the wireless multimode terminal. In this way, the decision device determines, according to a throughput rate that can be obtained by the wireless multimode terminal in each wireless network, a wireless network to be accessed by the wireless multimode terminal, which no longer allows the wireless multimode terminal to preferentially camp on or allows preferential admission to a wireless network, so that a wireless network to be accessed by the wireless multimode terminal can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

Figure 6:
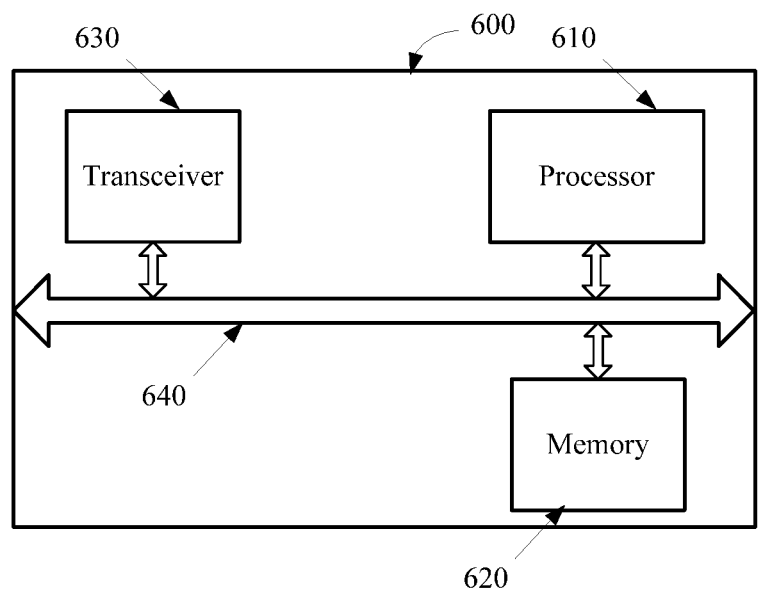
FIG. 6 is a schematic diagram of an embodiment of a decision device according to the present invention.

Referring to FIG. 6, FIG. 6 is a schematic structural diagram of a decision device according to an embodiment of the present invention. A decision device 600 includes: a processor 610, a memory 620, a transceiver 630, and a bus 640.

The processor 610, the memory 620, and the transceiver 630 are connected to each other by using the bus 640; the bus 640 may be an ISA bus, a PCI bus, an EISA bus, or the like. The bus may be classified into an address bus, a data bus, a control bus, and the like. For ease of description, only one thick line is used in FIG. 6 for representation, which does not indicate that there is only one bus or one type of bus.

The memory 620 is configured to store program and is also configured to store facial feature registration information of a user. Specifically, the program may include program code, where the program code includes a computer operation instruction. The memory 620 may include a high-speed RAM memory, or may further include a non-volatile memory (non-volatile memory), for example, at least one magnetic disk memory.

The transceiver 630 is configured to connect to another device and communicate with the another device. Specifically, the transceiver 630 is configured to receive throughput rates that are separately sent by wireless network devices in m wireless networks and can be separately obtained by a wireless multimode terminal in the m wireless networks, where the m wireless networks are wireless networks that can be currently accessed by the wireless multimode terminal, and m≥2.

The processor 610 executes the program code, so as to determine, according to the throughput rates that are received by the transceiver 630 and can be separately obtained by the wireless multimode terminal in the m wireless networks, a wireless network that is suitable to be accessed by the wireless multimode terminal in connected mode.

Optionally, the processor 610 may be specifically configured to: when the throughput rates that can be separately obtained by the wireless multimode terminal in the m wireless networks are completely equal, randomly determine, by the decision device, one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determine, by the decision device, a wireless network corresponding to the throughput rate with the largest value as the wireless network that is suitable to be accessed by the wireless multimode terminal in connected mode, or if a quantity of throughput rates with a largest value is greater than 1, randomly determine, by the decision device, one wireless network of wireless networks corresponding to the throughput rates with the largest value as the wireless network that is suitable to be accessed by the wireless multimode terminal in connected mode.

Optionally, the m wireless networks may include LTE and a UMTS, a wireless network device in the LTE is an eNB, a wireless network device in the UMTS is an RNC, and the processor 610 may be specifically configured to: when throughput rates that can be separately obtained by the wireless multimode terminal in the LTE and the UMTS are equal, randomly determine one wireless network of the LTE and the UMTS as the wireless network that is suitable to be accessed by the wireless multimode terminal in connected mode; or when throughput rates that can be separately obtained by the wireless multimode terminal in the LTE and the UMTS are not equal, determine a wireless network corresponding to a throughput rate with a relatively large value as the wireless network that is suitable to be accessed by the wireless multimode terminal in connected mode.

In this embodiment, a decision device determines, according to throughput rates that can be obtained by a wireless multimode terminal in m wireless networks, a wireless network that is suitable to be accessed by the wireless multimode terminal in connected mode, which no longer allows the wireless multimode terminal to preferentially camp on or allows preferential admission to a wireless network, so that a wireless network to be accessed by the wireless multimode terminal in connected mode can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

Figure 7:
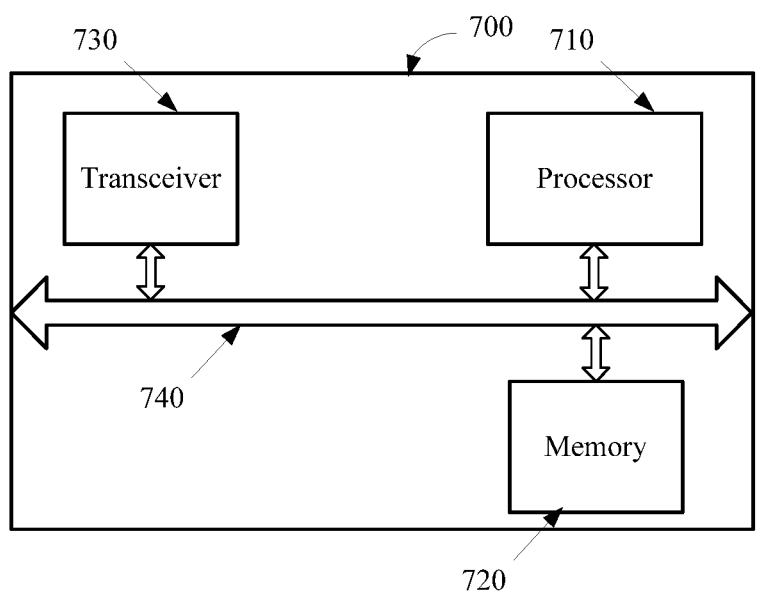
FIG. 7 is a schematic diagram of an embodiment of a wireless network device according to the present invention.

Referring to FIG. 7, FIG. 7 is a schematic structural diagram of a wireless network device according to an embodiment of the present invention. A wireless network device 700 includes: a processor 710, a memory 720, a transceiver 730, and a bus 740.

The processor 710, the memory 720, and the transceiver 730 are connected to each other by using the bus 740; the bus 740 may be an ISA bus, a PCI bus, an EISA bus, or the like. The bus may be classified into an address bus, a data bus, a control bus, and the like. For ease of description, only one thick line is used in FIG. 7 for representation, which does not indicate there is only one bus or one type of bus.

The memory 720 is configured to store program. Specifically, the program may include program code, where the program code includes a computer operation instruction. The memory 720 may include a high-speed RAM memory, or may further include a non-volatile memory (non-volatile memory), for example, at least one magnetic disk memory.

The processor 710 executes the program code, so as to determine a throughput rate that can be obtained by a wireless multimode terminal in a wireless network to which the wireless network device belongs.

The transceiver 730 is configured to connect to another device and communicate with the another device. Specifically, the transceiver 730 is configured to send the throughput rate determined by the processor 710 to a decision device, so that the decision device determines, according to the throughput rate, a wireless network that is suitable to be accessed by the wireless multimode terminal in connected mode.

Optionally, the wireless network device may be an eNB, the wireless network to which the wireless network device belongs may be LTE, and the processor 710 may be specifically configured to:

determine an SINR of the wireless multimode terminal according to RSRQ of the wireless multimode terminal and an RB utilization rate of a first cell to be accessed by the wireless multimode terminal, where the first cell is a cell of the eNB;

determine a TBS_INDEX and transmission efficiency of the wireless multimode terminal according to the SINR of the wireless multimode terminal; and determine, according to a load status parameter of the eNB, and the TBS_INDEX and the transmission efficiency of the wireless multimode terminal, the throughput rate that can be obtained by the wireless multimode terminal in the LTE.

Optionally, the processor 710 may be specifically configured to calculate the SINR of the wireless multimode terminal according to a formula: $RSRQ=-10\log(2+10\eta)-10\log(1+1/SINR)$, where $\eta$ is the RB utilization rate of the first cell to be accessed by the wireless multimode terminal.

Optionally, the processor 710 may be specifically configured to calculate the throughput rate that can be obtained by the wireless multimode terminal in the LTE according to the following formula:

$$\{TP_{LTE}=(n_{RE}/n_{RB})\times n_{RB}\times E/1000 \ n_{RE}/n_{RB}=(N_1-N_2)\times 12-N_{RE}, \text{ where}$$

$TP_{LTE}$ is the throughput rate that can be obtained by the wireless multimode terminal in the LTE; $n_{RB}$ is a quantity of idle RBs of the eNB; $n_{RE}$ is a quantity of idle REs on the idle RBs of the eNB; E is the transmission efficiency of the wireless multimode terminal; $N_1$ is a quantity of OFDM symbols included in each subframe; $N_2$ is a quantity of OFDM symbols occupied by a PDCCH in each subframe; and $N_{RE}$ is a quantity of REs occupied by pilot symbols on the idle RBs of the eNB.

Optionally, the wireless network device may be an RNC, the wireless network to which the wireless network device belongs may be a UMTS, and the processor 710 may be specifically configured to:

determine a CQI estimation value of the wireless multimode terminal and a quantity of idle codes of a second cell to be accessed by the wireless multimode terminal, where the second cell is a cell of the RNC;

determine a throughput rate of the second cell according to the CQI estimation value of the wireless multimode terminal and the quantity of idle codes of the second cell to be accessed by the wireless multimode terminal; and determine, according to the throughput rate of the second cell and a quantity of wireless multimode terminals connected to the second cell, the throughput rate that can be obtained by the wireless multimode terminal in the UMTS.

Optionally, the processor 710 may be specifically configured to determine the CQI estimation value of the wireless multimode terminal in the following manner: calculating an arithmetic average of CQIs of all HSDPA terminals in the second cell in a current statistical period; performing α filtering on the arithmetic average of the CQIs to obtain a CQI filtering value in the current statistical period; and determining the CQI filtering value in the current statistical period as the CQI estimation value of the wireless multimode terminal.

Optionally, the processor 710 may be specifically configured to perform, according to the following formula, the α filtering on the arithmetic average of the CQIs to obtain the CQI filtering value in the current statistical period:

$$CQI_{filt\_n}=(1-\alpha)\times CQI_{filt\_n-1}+\alpha\times CQI_{aver\_n}, \text{ where}$$

$CQI_{filt\_n}$ is the CQI filtering value for the current statistical period; $CQI_{aver\_n-1}$ is a CQI filtering value for a statistical period preceding the current statistical period; $CQI_{aver\_n}$ is the arithmetic average of the CQIs for the current statistical period; and α is a filtering coefficient.

Optionally, the processor 710 may be specifically configured to obtain, by means of calculation, the quantity of idle codes of the second cell by using the following formula: the quantity of idle codes of the second cell=a total quantity of codes that can be used in the second cell−a quantity of codes occupied by an R99 terminal−a quantity of codes occupied by a common signaling channel.

Optionally, the processor 710 may be specifically configured to determine, by using the following formula, the throughput rate of the wireless multimode terminal: the throughput rate that can be obtained by the wireless multimode terminal in the UMTS=the throughput rate of the second cell/the quantity of wireless multimode terminals connected to the second cell.

In this embodiment, a wireless network device calculates a throughput rate that can be obtained by a wireless multimode terminal and sends the throughput rate obtained by means of calculation to a decision device, so that the decision device determines, according to the throughput rate, a wireless network that is suitable to be accessed by the wireless multimode terminal in connected mode. In this way, the decision device determines, according to a throughput rate that can be obtained by the wireless multimode terminal in each wireless network, a wireless network that is suitable to be accessed by the wireless multimode terminal in connected mode, which no longer allows the wireless multimode terminal to preferentially camp on or allows preferential admission to a wireless network, so that a wireless network to be accessed by the wireless multimode terminal in connected mode can be properly determined, and configuration of network resources is optimized. As opposed to the prior art, load of a network that the wireless multimode terminal preferentially camps on or is preferentially admitted to is reduced, and communication quality is improved for wireless multimode terminals in the network that the wireless multimode terminal preferentially camps on or is preferentially admitted to.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for admission in connected mode, comprising:
receiving, by a decision device, throughput rates that are separately sent by wireless network devices in m wireless networks and can be separately obtained by a wireless multimode terminal in the m wireless networks, wherein the m wireless networks are wireless networks that can be currently accessed by the wireless multimode terminal, m≥2, and the m wireless networks comprise:
a Long Term Evolution (LTE) network in which the wireless network device is an evolved NodeB (eNB) and the throughput rate of the LTE network is determined by the eNB by:
determining, by the eNB, a signal to interference plus noise ratio SINR of the wireless multimode terminal according to reference signal received quality RSRQ of the wireless multimode terminal and a resource block RB utilization rate of a first cell to be accessed by the wireless multimode terminal, wherein the first cell is a cell of the eNB;
determining, by the eNB, a transport block size index TBS_INDEX and transmission efficiency of the wireless multimode terminal according to the SINR of the wireless multimode terminal; and
determining, by the eNB according to a load status parameter of the eNB, and the TBS_INDEX and the transmission efficiency of the wireless multimode terminal, the throughput rate that can be obtained by the wireless multimode terminal in the LTE network; and
a Universal Mobile Telecommunications System (UMTS) network in which the wireless network device is a radio network controller (RNC) and the throughput rate of the UMTS network is determined obtained by the RNC by:
determining, by the RNC, a channel quality indicator CQI estimation value of the wireless multimode terminal and a quantity of idle codes of a second cell to be accessed by the wireless multimode terminal, wherein the second cell is a cell of the RNC;
determining, by the RNC, a throughput rate of the second cell according to the CQI estimation value of the wireless multimode terminal and the quantity of idle codes of the second cell to be accessed by the wireless multimode terminal; and
determining, by the RNC according to the throughput rate of the second cell and a quantity of wireless multimode terminals connected to the second cell, the throughput rate that can be obtained by the wireless multimode terminal in the UMTS network; and
determining, by the decision device according to the throughput rates that can be separately obtained by the wireless multimode terminal in the m wireless networks, a wireless network that is suitable to be accessed by the wireless multimode terminal in connected mode.

2. The method according to claim 1, wherein the determining, by the decision device according to the throughput rates that can be separately obtained by the wireless multimode terminal in the m wireless networks, a wireless network that is suitable to be accessed by the wireless multimode terminal in connected mode comprises:

when the throughput rates that can be separately obtained by the wireless multimode terminal in the m wireless networks are completely equal, randomly determining, by the decision device, one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determining, by the decision device, a wireless network corresponding to the throughput rate with the largest value as the wireless network that is suitable to be accessed by the wireless multimode terminal in connected mode, or if a quantity of throughput rates with a largest value is greater than 1, randomly determining, by the decision device, one wireless network of wireless networks corresponding to the throughput rates with the largest value as the wireless network that is suitable to be accessed by the wireless multimode terminal in connected mode.

3. The method according to claim 2, wherein the determining, by the decision device according to the throughput rates that can be separately obtained by the wireless multimode terminal in the m wireless networks, a wireless network that is suitable to be accessed by the wireless multimode terminal in connected mode comprises:

when throughput rates that can be separately obtained by the wireless multimode terminal in the LTE and the UMTS are equal, randomly determining, by the decision device, one wireless network of the LTE and the UMTS as the wireless network that is suitable to be accessed by the wireless multimode terminal in connected mode; or when throughput rates that can be separately obtained by the wireless multimode terminal in the LTE and the UMTS are not equal, determining, by the decision device, a wireless network corresponding to a throughput rate with a relatively large value as the wireless network that is suitable to be accessed by the wireless multimode terminal in connected mode.

4. A method for admission in connected mode, comprising:

determining, by a wireless network device, a throughput rate that can be obtained by a wireless multimode terminal in a wireless network to which the wireless network device belongs; and sending, by the wireless network device, the determined throughput rate to a decision device, so that the decision device determines, according to the throughput rate, a wireless network that is suitable to be accessed by the wireless multimode terminal in connected mode, wherein the wireless network device is an evolved NodeB eNB, the wireless network to which the wireless network device belongs is Long Term Evolution LTE, and the determining, by an eNB, a throughput rate that can be obtained by a wireless multimode terminal in LTE comprises:

determining, by the eNB, a signal to interference plus noise ratio SINR of the wireless multimode terminal according to reference signal received quality RSRQ of the wireless multimode terminal and a resource block RB utilization rate of a first cell to be accessed by the wireless multimode terminal, wherein the first cell is a cell of the eNB;

determining, by the eNB, a transport block size index TBS_INDEX and transmission efficiency of the wireless multimode terminal according to the SINR of the wireless multimode terminal; and determining, by the eNB according to a load status parameter of the eNB, and the TBS_INDEX and the transmission efficiency of the wireless multimode terminal, the throughput rate that can be obtained by the wireless multimode terminal in the LTE.

5. The method according to claim 4, wherein the determining, by the eNB, a SINR of the wireless multimode terminal according to RSRQ of the wireless multimode terminal and an RB utilization rate of a first cell to be accessed by the wireless multimode terminal comprises:

calculating, by the eNB, the SINR of the wireless multimode terminal according to a formula: $RSRQ=-10\log(2+10\eta)-10\log(1+1/SINR)$, wherein $\eta$ is the RB utilization rate of the first cell to be accessed by the wireless multimode terminal.

6. The method according to claim 4, wherein the determining, by the eNB according to a load status parameter of the eNB, and the TBS_INDEX and the transmission efficiency of the wireless multimode terminal, the throughput rate that can be obtained by the wireless multimode terminal in the LTE comprises:

calculating, by the eNB, the throughput rate that can be obtained by the wireless multimode terminal in the LTE according to the following formula:

$$\{TP_{LTE}=(n_{RE}/n_{RB})\times n_{RB}\times E/1000 n_{RE}/n_{RB}=(N_1-N_2)\times 12-N_{RE}, \text{wherein}$$

$TP_{LTE}$ is the throughput rate that can be obtained by the wireless multimode terminal in the LTE; $n_{RB}$ is a quantity of idle RBs of the eNB; $n_{RE}$ is a quantity of idle resource elements REs on the idle RBs of the eNB; E is the transmission efficiency of the wireless multimode terminal; $N_1$ is a quantity of orthogonal frequency division multiplexing OFDM symbols comprised in each subframe; $N_2$ is a quantity of OFDM symbols occupied by a physical downlink control channel PDCCH in each subframe; and $N_{RE}$ is a quantity of REs occupied by pilot symbols on the idle RBs of the eNB.

7. A method for admission in connected mode, comprising:

determining, by a wireless network device, a throughput rate that can be obtained by a wireless multimode terminal in a wireless network to which the wireless network device belongs; and sending, by the wireless network device, the determined throughput rate to a decision device, so that the decision device determines, according to the throughput rate, a wireless network that is suitable to be accessed by the wireless multimode terminal in connected mode, wherein the wireless network device is a radio network controller RNC, the wireless network to which the wireless network device belongs is a Universal Mobile Telecommunications System UMTS, and the determining, by an RNC, a throughput rate that can be obtained by a wireless multimode terminal in a UMTS comprises:

determining, by the RNC, a channel quality indicator CQI estimation value of the wireless multimode terminal and a quantity of idle codes of a second cell to be accessed by the wireless multimode terminal, wherein the second cell is a cell of the RNC;

determining, by the RNC, a throughput rate of the second cell according to the CQI estimation value of the wireless multimode terminal and the quantity of idle codes of the second cell to be accessed by the wireless multimode terminal; and determining, by the RNC according to the throughput rate of the second cell and a quantity of wireless multimode terminals connected to the second cell, the throughput rate that can be obtained by the wireless multimode terminal in the UMTS.

8. The method according to claim 7, wherein the determining, by the RNC, a CQI estimation value of the wireless multimode terminal comprises:

calculating, by the RNC, an arithmetic average of CQIs of all High Speed Downlink Packet Access HSDPA terminals in the second cell for a current statistical period;

performing, by the RNC, a filtering on the arithmetic average of the CQIs to obtain a CQI filtering value for the current statistical period; and determining, by the RNC, the CQI filtering value for the current statistical period as the CQI estimation value of the wireless multimode terminal.

9. The method according to claim 8, wherein the performing, by the RNC, α filtering on the arithmetic average of the CQIs to obtain a CQI filtering value for the current statistical period comprises:

performing, by the RNC according to the following formula, the α filtering on the arithmetic average of the CQIs to obtain the CQI filtering value for the current statistical period:

$CQI_{filt\_n} = (1-\alpha) \times CQI_{filt\_n-1} + \alpha \times CQI_{aver\_n}$, wherein $CQI_{filt\_n}$ is the CQI filtering value for the current statistical period; $CQI_{aver\_n-1}$ is a CQI filtering value for a statistical period preceding the current statistical period; $CQI_{aver\_n}$ is the arithmetic average of the CQIs for the current statistical period; and α is a filtering coefficient.

10. The method according to claim 7, wherein the determining, by the RNC, a quantity of idle codes of a second cell comprises:

obtaining, by the RNC by means of calculation, the quantity of idle codes of the second cell by using the following formula: the quantity of idle codes of the second cell=a total quantity of codes that can be used in the second cell−a quantity of codes occupied by an R99 terminal−a quantity of codes occupied by a common signaling channel.

11. The method according to claim 7, wherein the determining, by the RNC according to the throughput rate of the second cell and a quantity of wireless multimode terminals connected to the second cell, the throughput rate that can be obtained by the wireless multimode terminal in the UMTS comprises:

determining, by the RNC by using the following formula, the throughput rate that can be obtained by the wireless multimode terminal in the UMTS: the throughput rate that can be obtained by the wireless multimode terminal in the UMTS=the throughput rate of the second cell/the quantity of wireless multimode terminals connected to the second cell.

12. A decision device for admission in connected mode, comprising:

a transceiver, configured to receive throughput rates that are separately sent by wireless network devices in m wireless networks and can be separately obtained by a wireless multimode terminal in the m wireless networks, wherein the m wireless networks are wireless networks that can be currently accessed by the wireless multimode terminal, m≥2, and the m wireless networks comprise:

a Long Term Evolution (LTE) network in which the wireless network device is an evolved NodeB (eNB) and the throughput rate of the LTE network is determined by the eNB by:

determining, by the eNB, a signal to interference plus noise ratio SINR of the wireless multimode terminal according to reference signal received quality RSRQ of the wireless multimode terminal and a resource block RB utilization rate of a first cell to be accessed by the wireless multimode terminal, wherein the first cell is a cell of the eNB;

determining, by the eNB, a transport block size index TBS_INDEX and transmission efficiency of the wireless multimode terminal according to the SINR of the wireless multimode terminal; and determining, by the eNB according to a load status parameter of the eNB, and the TBS_INDEX and the transmission efficiency of the wireless multimode terminal, the throughput rate that can be obtained by the wireless multimode terminal in the LTE network; and a Universal Mobile Telecommunications System (UMTS) network in which the wireless network device is a radio network controller (RNC) and the throughput rate of the UMTS network is determined by the RNC by:

determining, by the RNC, a channel quality indicator CQI estimation value of the wireless multimode terminal and a quantity of idle codes of a second cell to be accessed by the wireless multimode terminal, wherein the second cell is a cell of the RNC;

determining, by the RNC, a throughput rate of the second cell according to the CQI estimation value of the wireless multimode terminal and the quantity of idle codes of the second cell to be accessed by the wireless multimode terminal; and determining, by the RNC according to the throughput rate of the second cell and a quantity of wireless multimode terminals connected to the second cell, the throughput rate that can be obtained by the wireless multimode terminal in the UMTS network; and a processor, configured to determine, according to the throughput rates that are received by the transceiver and can be separately obtained by the wireless multimode terminal in the m wireless networks, a wireless network that is suitable to be accessed by the wireless multimode terminal in connected mode.

13. The decision device according to claim 12, wherein the processor is configured to: when the throughput rates that can be separately obtained by the wireless multimode terminal in the m wireless networks are completely equal, randomly determine, by the decision device caused by the processor, one wireless network of the m wireless networks as the wireless network that is suitable to be accessed by the wireless multimode terminal in connected mode; or when the throughput rates that can be separately obtained by the wireless multimode terminal in the m wireless networks are not completely equal, if a quantity of throughput rates with a largest value is 1, determine, by the decision device caused by the processor, a wireless network corresponding to the throughput rate with the largest value as the wireless network that is suitable to be accessed by the wireless multimode terminal in connected mode, or if a quantity of throughput rates with a largest value is greater than 1, randomly determine, by the decision device caused by the processor, one wireless network of wireless networks corresponding to the throughput rates with the largest value as the wireless network that is suitable to be accessed by the wireless multimode terminal in connected mode.

14. The decision device according to claim 13, wherein the processor is configured to: when throughput rates that can be separately obtained by the wireless multimode terminal in the LTE and the UMTS are equal, randomly determine one wireless network of the LTE and the UMTS as the wireless network that is suitable to be accessed by the wireless multimode terminal in connected mode; or when throughput rates that can be separately obtained by the wireless multimode terminal in the LTE and the UMTS are not equal, determine a wireless network corresponding to a throughput rate with a relatively large value as the wireless network that is suitable to be accessed by the wireless multimode terminal in connected mode.

15. An apparatus for admission in connected mode, comprising:
   a processor, configured to determine a throughput rate that can be obtained by a wireless multimode terminal in a wireless network to which a wireless network device belongs; and
   a transceiver, configured to send the throughput rate determined by the processor to a decision device, so that the decision device determines, according to the throughput rate, a wireless network that is suitable to be accessed by the wireless multimode terminal in connected mode, wherein the wireless network device is an evolved NodeB eNB, the wireless network to which the wireless network device belongs is Long Term Evolution LTE, and the processor configured to determine a signal to interference plus noise ratio SINR of the wireless multimode terminal according to reference signal received quality RSRQ of the wireless multimode terminal and a resource block RB utilization rate of a first cell to be accessed by the wireless multimode terminal, wherein the first cell is a cell of the eNB; and configured to determine a transport block size index TBS_INDEX and transmission efficiency of the wireless multimode terminal according to the SINR of the wireless multimode terminal; and
   configured to determine, according to a load status parameter of the eNB, and the TBS_INDEX and the transmission efficiency of the wireless multimode terminal, the throughput rate that can be obtained by the wireless multimode terminal in the LTE.

16. The apparatus according to claim 15, wherein the processor is configured to calculate the SINR of the wireless multimode terminal according to a formula: RSRQ=−10 log(2+10η)−10 log(1+1/SINR), wherein η is the RB utilization rate of the first cell to be accessed by the wireless multimode terminal.

17. The apparatus according to claim 15, wherein the processor is configured to calculate the throughput rate that can be obtained by the wireless multimode terminal in the LTE according to the following formula:

$$\{TP_{LTE}=(n_{RE}/n_{RB})\times n_{RB}\times E/1000 n_{RE}/n_{RB}=(N_1-N_2)\times 12-N_{RE}, \text{ wherein}$$

$TP_{LTE}$ is the throughput rate that can be obtained by the wireless multimode terminal in the LTE; $n_{RB}$ is a quantity of idle RBs of the eNB; $n_{RE}$ is a quantity of idle resource elements REs on the idle RBs of the eNB; E is the transmission efficiency of the wireless multimode terminal; $N_1$ is a quantity of orthogonal frequency division multiplexing OFDM symbols comprised in each subframe; $N_2$ is a quantity of OFDM symbols occupied by a physical downlink control channel PDCCH in each subframe; and $N_{RE}$ is a quantity of REs occupied by pilot symbols on the idle RBs of the eNB.

18. An apparatus for admission in connected mode, comprising:
   a processor, configured to determine a throughput rate that can be obtained by a wireless multimode terminal in a wireless network to which a wireless network device belongs; and
   a transceiver, configured to send the throughput rate determined by the processor to a decision device, so that the decision device determines, according to the throughput rate, a wireless network that is suitable to be accessed by the wireless multimode terminal in connected mode, wherein the wireless network device is an RNC, the wireless network to which the wireless network device belongs is a UMTS, and the processor configured to determine a channel quality indicator CQI estimation value of the wireless multimode terminal and a quantity of idle codes of a second cell to be accessed by the wireless multimode terminal, wherein the second cell is a cell of the RNC; and
   configured to determine a throughput rate of the second cell according to the CQI estimation value of the wireless multimode terminal and the quantity of idle codes of the second cell to be accessed by the wireless multimode terminal; and
   configured to determine, according to the throughput rate of the second cell and a quantity of wireless multimode terminals connected to the second cell, the throughput rate that can be obtained by the wireless multimode terminal in the UMTS.

19. The apparatus according to claim 18, wherein the processor configured to calculate an arithmetic average of CQIs of all High Speed Downlink Packet Access HSDPA terminals in the second cell for a current statistical period;
   a filtering module, configured to perform α filtering on the arithmetic average of the CQIs to obtain a CQI filtering value for the current statistical period; and
   a determining module, configured to determine the CQI filtering value for the current statistical period as the CQI estimation value of the wireless multimode terminal.

20. The apparatus according to claim 19, wherein the filtering module is configured to:
   perform, according to the following formula, the α filtering on the arithmetic average of the CQIs to obtain the CQI filtering value for the current statistical period:

$$CQI_{filt\_n}=(1-\alpha)\times CQI_{filt\_n-1}+\alpha\times CQI_{aver\_n}, \text{ wherein}$$

$CQI_{filt\_n}$ is the CQI filtering value for the current statistical period; $CQI_{aver\_n-1}$ is a CQI filtering value for a statistical period preceding the current statistical period; $CQI_{aver\_n}$ is the arithmetic average of the CQIs for the current statistical period; and a is a filtering coefficient.

21. The apparatus according to claim 18, wherein the processor configured to obtain, by means of calculation, the quantity of idle codes of the second cell by using the following formula: the quantity of idle codes of the second cell=a total quantity of codes that can be used in the second cell−a quantity of codes occupied by an R99 terminal−a quantity of codes occupied by a common signaling channel.

22. The apparatus according to claim 18, wherein the processor is specifically configured to determine, by using the following formula, the throughput rate that can be obtained by the wireless multimode terminal in the UMTS: the throughput rate that can be obtained by the wireless multimode terminal in the UMTS=the throughput rate of the second cell/the quantity of wireless multimode terminals connected to the second cell.

\* \* \* \* \*

UNITED STATES PATENT AND TRADEMARK OFFICE
CERTIFICATE OF CORRECTION

PATENT NO. : 10,123,342 B2  
APPLICATION NO. : 15/270420  
DATED : November 6, 2018  
INVENTOR(S) : Huisong Wang et al.

Page 1 of 1

It is certified that error appears in the above-identified patent and that said Letters Patent is hereby corrected as shown below:

In the Claims

Column 26, Line 30 (approximately):
In Claim 6, delete "$\{TP_{LTE}=(n_{RE}/n_{RB})\times n_{RB}\times E/1000 n_{RE}/n_{RB}=(N_1-N_2)\times 12-N_{RE},$ wherein" and insert 
$$\begin{cases} TP_{LTE} = (n_{RE}/n_{RB}) \times n_{RB} \times E/1000 \\ n_{RE}/n_{RB} = (N_1 - N_2) \times 12 - N_{RE} \end{cases}$$
, wherein --, therefor.

Column 27, Line 17:
In Claim 8, delete "a" and insert -- $\alpha$ --, therefor.

Column 29, Line 60:
In Claim 17, delete "$\{TP_{LTE}=(n_{RE}/n_{RB})\times n_{RB}\times E/1000 n_{RE}/n_{RB}=(N_1-N_2)\times 12-N_{RE},$ wherein" and insert 
$$\begin{cases} TP_{LTE} = (n_{RE}/n_{RB}) \times n_{RB} \times E/1000 \\ n_{RE}/n_{RB} = (N_1 - N_2) \times 12 - N_{RE} \end{cases}$$
, wherein --, therefor.

Column 30, Line 59:
In Claim 20, delete "a" and insert -- $\alpha$ --, therefor.

Column 31, Line 2:
Delete "specifically".

Signed and Sealed this  
Seventeenth Day of September, 2019

Andrei Iancu  
*Director of the United States Patent and Trademark Office*